United States Patent
Jin et al.

(10) Patent No.: US 7,346,641 B2
(45) Date of Patent: Mar. 18, 2008

(54) METHOD AND APPARATUS FOR BASIS CONVERSION IN FINITE FIELD

(75) Inventors: Weon-il Jin, Suwon (KR); Mi-suk Huh, Seoul (KR); Chang-woo Seo, Suwon (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 725 days.

(21) Appl. No.: 10/702,740

(22) Filed: Nov. 7, 2003

(65) Prior Publication Data
US 2004/0098437 A1 May 20, 2004

(30) Foreign Application Priority Data
Nov. 9, 2002 (KR) .................. 10-2002-0069460

(51) Int. Cl.
G06F 7/72 (2006.01)
(52) U.S. Cl. ........................................... 708/492
(58) Field of Classification Search ................ 708/492
See application file for complete search history.

(56) References Cited

U.S. PATENT DOCUMENTS

| | | |
|---|---|---|
| 4,994,995 A | 2/1991 | Anderson et al. |
| 5,854,759 A | 12/1998 | Kaliski, Jr. et al. |
| 6,286,022 B1 | 9/2001 | Kaliski, Jr. et al. |
| 2001/0056452 A1 | 12/2001 | Kaliski et al. |
| 2004/0078407 A1* | 4/2004 | Naslund et al. ............ 708/492 |
| 2006/0072743 A1* | 4/2006 | Naslund et al. ............ 380/28 |

FOREIGN PATENT DOCUMENTS

KR 2000-0026250 5/2000

OTHER PUBLICATIONS

Berlekamp, Elwyn, "Bit-Serial Reed—Solomon Encoders", IEEE Transactions on Information Theory, vol. IT-28, No. 6, pp. 869-874 (Nov. 1982).
Fenn, S.T.J., et al., "Bit-serial dual basis systolic multipliers for GF(2m)", IEEE 0-7803-2570-2/95, pp. 2000-2003 (1995).
Fenn, S.T.J., et al., "Dual basis systolic multipliers for GF(2m)", IEE Proc.-Comput. Digit. Tech., vol. 144, No. 1, pp. 43-46, (Jan. 1997).
Fenn, S.T.J., et al., "Finite Field Inversion Over the Dual Basis", IEEE Transactions on Very Large Scale Integration (VLSI) Systems, vol. 4, No. 1, pp. 134-137, (Mar. 1996).
Fenn, Sebastian T.J., et al., "GF(2m) Multiplication and Division Over the Dual Basis", IEEE Transactions on Computers, vol. 45, No. 3, pp. 319-327 (Mar. 1996).

(Continued)

*Primary Examiner*—D. H. Malzahn
(74) *Attorney, Agent, or Firm*—Lee & Morse, P.C.

(57) ABSTRACT

There are provided efficient basis conversion matrices $D_{sd}$ and $D_{ds}$ and a basis conversion method in a finite field $GF(2^n)$ using the basis conversion matrices for a case where a defining polynomial is a pentanomial, $x^n+x^{k(3)}+x^{k(2)}+x^{k(1)}+1$, and the exponents n, k(3), k(2), and k(1) satisfy the condition, $n-k(3)>k(3)-k(1)$. In addition, an apparatus for the basis conversion in the finite field $GF(2^n)$ is provided. Since a pentanomial having a general form in an arbitrary degree is used as the defining polynomial, basis conversion between a standard representation and a dual representation is efficiently performed. Consequently, a dual basis multiplier can be efficiently implemented.

13 Claims, 5 Drawing Sheets

OTHER PUBLICATIONS

Gollmann, D., "Equally Spaced Polynomials, Dual Bases, and Multiplication in F2n", IEEE Transactions on Computers, vol. 51, No. 5, pp. 588-591 (May 2002).

Hasan, M.A., et al., "Division and bit-serial multiplication over GF(qm)" IEE Proceedings-E, vol. 139, No. 3, pp. 230-236, (May 1992).

Hsu, I.S., et al., "A Comparison of VLSI Architecture of Finite Field Multipliers Using Dual, Normal, or Standard Bases", IEEE Transactions on Computers, vol. 37, No. 6, pp. 735-739, (Jun. 1988).

Kwon, Soonhak, et al., "Efficient Bit Serial Multiplication Using Optimal Normal Bases of Type II in GF(2m)", Information Security. International Conference: Proceedings ISC, pp. 300-308 (Sep. 30, 2002).

Morii, Masakatu, et al., "Efficient Bit-Serial Multiplication and the Discrete-Time Wiener-Hopf Equation Over Finite Fields", IEEE Transactions on Information Theory, vol. 35, No. 6, pp. 1177-1183, (Nov. 1989).

Scott, P. Andrew, et al., "A Fast VLSI Multiplier for GF(2m)", IEEE Journal on Selected Areas in Communication, vol. SAC-4, No. 1, pp. 62-65, (Jan. 1986).

Stinson, D.R., "On Bit-Serial Multiplication and Dual Bases in GF(2m)", IEEE Transactions on Information Theory, vol. 37, No. 6, pp. 1733-1736 (Nov. 1991).

Wang, Charles C., "VLSI Architectures for Computing Multiplications and Inverses in GF(2m)", IEEE Transactions on Computers, vol. C-34, No. 8, pp. 709-717, (Aug. 1985).

Wozniak, J.J., "Systolic dual basis serial multiplier", IEE Proc. Comput. Digit. Tech., vol. 145, No. 3, pp. 237-241 (May 1998).

Wu, Waupeng, "New Low-Complexity Bit-Parallel Finite Field Multipliers Using Weakly Dual Bases", IEEE Transactions on Computers, vol. 47, No. 11, pp. 1223-1234, (Nov. 1998).

* cited by examiner

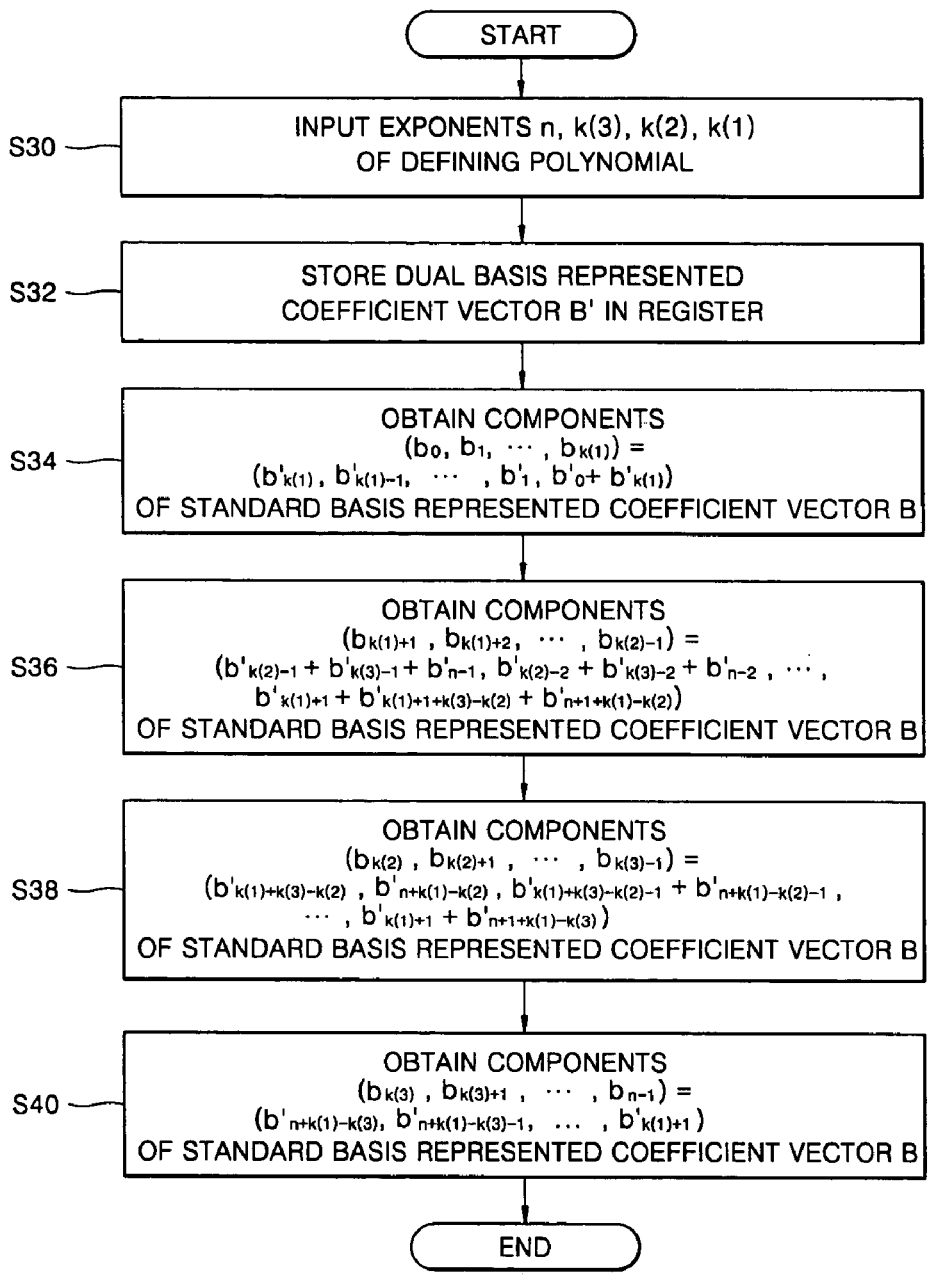

METHOD AND APPARATUS FOR BASIS CONVERSION IN FINITE FIELD

BACKGROUND OF THE INVENTION

1. Field of the Invention

The present invention relates to basis conversion in a finite field $GF(2^n)$. More particularly, the present invention relates to an apparatus and method for basis conversion between a standard representation on a standard basis and a dual representation on a dual basis.

2. Description of the Related Art

A finite field $GF(2^n)$ is a number system including $2^n$ elements. Based on the fact that each element of a finite field can be represented with n bits, practical applications of the finite field may be accomplished. Practical applications, such as error correction codes and implementation of an elliptic curve cryptosystem in hardware, frequently use calculations in $GF(2^n)$. An apparatus for coding/decoding Reed-Solomon codes is required to perform calculations in $GF(2^n)$, and an encryption/decryption apparatus of an elliptic curve cryptosystem is required to perform calculations in $GF(2^n)$, where "n" is a large value.

A finite field $GF(2)$ is a number system having addition and multiplication rules defined by Formula (1) and having only binary numbers 0 and 1 as its elements.

$$0+0=1+1=0$$
$$0+1=1+0=1$$
$$0\times 0=1\times 0=0\times 1=0$$
$$1\times 1=1 \quad (1)$$

Here, the addition is an XOR (exclusive OR) operation, and the multiplication is an AND operation.

The finite field $GF(2^n)$ (where n>1) is a number system including $2^n$ elements. In this number system, addition and multiplication correspond to arithmetic modulo with respect to an irreducible n-degree polynomial having coefficients in $GF(2)$. The irreducible n-degree polynomial is referred to as a defining polynomial. When a root of the defining polynomial is represented with $\alpha$, an element of the finite field has a standard representation defined by Formula (2).

$$a_0+a_1\alpha+a_2\alpha^2+\ldots+a_{n-1}\alpha^{n-1}=(a_0,a_1,a_2,\ldots a_{n-1})$$
$$a_i \in GF(2) \quad (2)$$

Multiplication of two elements of $GF(2^n)$ is performed by polynomial multiplication of $\alpha$ followed by a modulo operation with the help of the defining polynomial. Addition of two elements of $GF(2^n)$ is performed by polynomial addition of $\alpha$.

There are three typical representative methods of representing the elements of the finite field $GF(2^n)$. These methods are defined by different bases. In a standard representation, the elements of the finite field $GF(2^n)$ are represented with a standard basis (or polynomial basis) $\{1, \alpha, \alpha^2, \alpha^3, \ldots, \alpha^{n-1}\}$. In addition, there are a dual basis and a normal basis.

Formula (3) defines two bases $\{\beta_i\}$ and $\{\gamma_j\}$ which are dual to each other.

$$Tr(\delta\beta_i\gamma_j)=0(i\neq j), 1(i=j), \delta \in GF(2^n) \quad (3)$$

In other words, each of the two bases $\{\beta_0, \beta_1, \beta_2, \ldots, \beta_{n-1}\}$ and $\{\gamma_0, \gamma_1, \gamma_2, \ldots, \gamma_{n-1}\}$ satisfying Formula (3) is a dual basis of the other with respect to $Tr(\delta \cdot)$.

When a subset $\{\beta, \beta^2, \beta^4, \beta^8, \ldots, \beta^{2-n}\}$ of $GF(2^n)$ is a basis, the basis is called a normal basis.

The complexity of a logic circuit required for arithmetic in $GF(2^n)$ essentially depends on a particular method by which the elements of a finite field are represented. Representative finite field multipliers are a "dual basis multiplier," a "normal basis multiplier," and a "standard basis multiplier". A dual basis multiplier can be implemented using a linear feedback shift register and is known as requiring a least chip area if basis conversion is excluded. Finite field arithmetic using a normal basis is very efficient for division, square calculation, and exponential calculation, but reduction of a chip area for high degrees is desired. Generally, a standard basis multiplier does not require basis conversion and is easier in terms of extension to a higher-degree finite field and design compared to dual and normal basis multipliers.

Extension to a higher-degree finite field is more difficult in a dual basis multiplier than in a standard basis multiplier because of the complexity of a basis conversion matrix. The present invention provides a basis conversion matrix and method for a dual basis multiplier.

The following description concerns an algorithm performed by a dual basis multiplier.

Let's assume that a polynomial $X^n+X^{k(s)}+X^{k(s-1)}+\ldots+X^{k(1)}+1$ is a defining polynomial of $GF(2^n)$, A and B are elements of $GF(2^n)$, and a basis $\{\beta_0, \beta_1, \beta_2, \ldots, \beta_{n-1}\}$ is a dual basis of a standard basis $\{1, \alpha, \alpha^2, \alpha^3, \ldots, \alpha^{n-1}\}$. A matrix $D_{sd}$ is for standard representation to dual representation conversion, and a matrix $D_{ds}$ is for dual representation to standard representation conversion. In order to calculate a multiplication $C=AB$, a case where both input and output are dual representations and a case where both input and output are standard representations will be described.

Firstly, the case where both input and output are dual representations, as shown in Formula (4), will be described.

$$A=a_0\beta_0+a_1\beta_1+a_2\beta_2+\ldots+a_{n-1}\beta_{n-1}=$$
$$(a_0,a_1,a_2,\ldots,a_{n-1})$$

$$B=b_0\beta_0+b_1\beta_1+b_2\beta_2+\ldots+b_{n-1}\beta_{n-1}=$$
$$(b_0,b_1,b_2,\ldots,b_{n-1}) \quad (4)$$

According to the algorithm of the dual basis multiplier, basis conversion is performed even if an input is a dual representation. After obtaining $D_{ds}B$ by performing basis conversion on an input element B, matrix calculation $C=MD_{ds}B$ is performed. Here, a matrix M is defined by Formula (5).

$$M = \begin{pmatrix} a_0 & a_1 & a_2 & \cdots & a_{n-2} & a_{n-1} \\ a_1 & a_2 & a_3 & \cdots & a_{n-1} & a_n \\ a_2 & a_3 & a_4 & \cdots & a_n & a_{n+1} \\ \vdots & \vdots & \vdots & \ddots & \vdots & \vdots \\ a_{n-1} & a_n & a_{n+1} & \cdots & a_{2n-3} & a_{2n-2} \end{pmatrix} \quad (5)$$

Here, $a_{n+i}=a_i+a_{i+k(1)}+a_{i+k(2)}+a_{i+k(3)}+\ldots+a_{i+k(s)}$ $(i\geq 0)$.

Next, the case where both input and output are standard representations, as shown in Formula (6), will be described.

$$A=a_0\alpha^0+a_1\alpha^1+a_2\alpha^2+\ldots+a_{n-1}\alpha^{n-1}=(a_0,a_1,a_2,\ldots,a_{n-1})$$

$$B=b_0\alpha^0+b_1\alpha^1+b_2\alpha^2+\ldots+b_{n-1}\alpha^{n-1}=(b_0,b_1,b_2,\ldots,b_{n-1}) \quad (6)$$

In this case, the calculation is a little more complicated. In the dual basis multiplier, a standard representation is converted into a dual representation. In other words, $D_{sd}A$ expressed by Formula (7) is obtained by performing basis conversion using the basis conversion matrix $D_{sd}$.

$$(a_0', a_1', a_2', \ldots, a_{n-1}') = D_{sd}A \quad (7)$$

Next, a matrix M expressed by Formula (8) is obtained based on $D_{sd}A$.

$$M = \begin{pmatrix} a_0' & a_1' & a_2' & \cdots & a_{n-2}' & a_{n-1}' \\ a_1' & a_2' & a_3' & \cdots & a_{n-1}' & a_n' \\ a_2' & a_3' & a_4' & \cdots & a_n' & a_{n+1}' \\ \vdots & \vdots & \vdots & \ddots & \vdots & \vdots \\ a_{n-1}' & a_n' & a_{n+1}' & \cdots & a_{2n-3}' & a_{2n-2}' \end{pmatrix} \quad (8)$$

Here, $a'_{n+i} = a'_i + a'_{i+k(1)} + a'_{i+k(2)} + a'_{i+k(3)} + \ldots + a'_{i+k(s)}$ ($i \geq 0$).

Next, a dual representation MB is obtained using a matrix calculation. The output C, i.e., the result of multiplication, must be a dual representation, so $C = D_{ds}MB$ is obtained using the basis conversion matrix $D_{ds}$.

Basis conversion is performed by multiplying the basis conversion matrix $D_{sd}$ or $D_{ds}$ by a vector (an element of a finite field). For every basis conversion in a dual basis multiplier, except for some particular one, the complexity of a basis conversion matrix is very high. In addition, for every basis conversion in a dual basis multiplier, extension to a higher-degree finite field and design is very difficult.

There are three conventional techniques relating to basis conversion, which are simply described below.

The first conventional technique relating to an efficient basis conversion matrix for a particular degree provides a matrix defined by Formula (9) in order to convert a dual representation of a particular degree "n" to a standard representation.

$$D_{ds} = \begin{pmatrix} 1 & 1 & 0 & 0 & \cdots & 0 & 0 & 0 \\ 0 & 1 & 0 & 0 & \cdots & 0 & 0 & 1 \\ 0 & 1 & 0 & 0 & \cdots & 0 & 1 & 0 \\ 0 & 1 & 0 & 0 & \cdots & 1 & 0 & 0 \\ \vdots & \vdots & \vdots & \vdots & \ddots & \vdots & \vdots & \vdots \\ 0 & 1 & 1 & 0 & \cdots & 0 & 0 & 0 \\ 0 & 0 & 0 & 0 & \cdots & 0 & 0 & 0 \end{pmatrix}_{(n+1) \times (n+1)} \quad (9)$$

Here $D_{ds}$ is a basis conversion matrix composed of 2n number of 1s. Since the size of the matrix $D_{ds}$ is n+1, the size of all matrices C, M, and B in an arithmetic operation $C = MD_{ds}B$ must be adjusted to n+1. The matrix C has a form $(c_0, c_1, c_2, \ldots, c_{n-1}, c)$, and its final output is $(c_0, c_1, c_2, \ldots, c_{n-1})$. The matrix B is $(b_0, b_1, b_2, \ldots, b_{n-1}, s[B])$, and the matrix M is expressed by Formula (10).

$$M = \begin{pmatrix} a_0 & a_1 & a_2 & \cdots & a_{n-2} & a_{n-1} & s[A] \\ a_1 & a_2 & a_3 & \cdots & a_{n-1} & s[A] & a_0 \\ a_2 & a_3 & a_4 & \cdots & s[A] & a_0 & a_1 \\ \vdots & \vdots & \vdots & \ddots & \vdots & \vdots & \vdots \\ a_{n-1} & s[A] & a_0 & \cdots & a_{n-4} & a_{n-3} & a_{n-2} \\ s[A] & a_0 & a_1 & \cdots & a_{n-3} & a_{n-2} & a_{n-1} \end{pmatrix} \quad (10)$$

Here, $s[A] = a_0 + a_1 + a_2 + \ldots + a_{n-1}$. $s[B] = b_0 + b_1 + b_2 + \ldots + b_{n-1}$.

In the first conventional technique, the particular degrees "n" are used as shown in Formula (11).

$$n = 4, 10, 12, 18, 28, 36, 52, 58, 60, 66, 82, 100, 106, 130, 138, \\ 148, 162, 172, 178, 180, 196, 210, 226, 268, 292, \ldots \quad (11)$$

A defining polynomial of the particular "n" degree is expressed by Formula (12).

$$\sum_{i=0}^{n} x^i = x^n + x^{n-1} + x^{n-2} + \ldots + x + 1 \quad (12)$$

By providing a matrix M' expressed by Formula (13) in $C = MD_{ds}B = BM'$, the first conventional technique provides an efficient dual basis multiplier, which removes basis conversion.

$$M' = \begin{pmatrix} a_0 & a_1 & a_2 & \cdots & a_{n-1} & s[A] \\ s[A] & a_0 & a_1 & \cdots & a_{n-2} & a_{n-1} \\ a_{n-1} & s[A] & a_0 & \cdots & a_{n-3} & a_{n-2} \\ \vdots & \vdots & \vdots & \ddots & \vdots & \vdots \\ a_2 & a_3 & a_4 & \cdots & a_0 & a_1 \\ a_1 & a_2 & a_3 & \cdots & s[A] & a_0 \end{pmatrix} \quad (13)$$

However, as shown in Formula (11), the first conventional technique is restricted to the particular degrees and uses a defining polynomial having a particular form expressed by Formula (12) rather than a general form. Conversely, the present invention provides a method which is not restricted to particular degrees and is applied to a defining polynomial, i.e., a pentanomial, having a general form.

The second conventional technique relating to an efficient basis conversion matrix for a particular defining polynomial provides a basis conversion matrix, which is simple and easily expandable in a finite field GF($2^n$) using a defining polynomial having a particular form. The second conventional technique provides a basis conversion matrix for a case where a defining polynomial is a trinomial expressed by Formula (14) and a basis conversion matrix for a case where a defining polynomial is a pentanomial expressed by Formula (15).

$$x^n + x^k + 1 \quad (14)$$

$$x^n + x^{k+2} + x^{k+1} + x^k + 1 \quad (15)$$

When the defining polynomial is a trinomial having a particular form expressed by Formula (14), basis conversion matrices $D_{ds}$ and $D_{sd}$ are express by Formula (16).

$$D_{ds} = D_{sd} = \begin{pmatrix} \begin{pmatrix} 0 & \cdots & 1 \\ \vdots & \ddots & \vdots \\ 1 & \cdots & 0 \end{pmatrix}_{k \times k} & 0 \\ 0 & \begin{pmatrix} 0 & 0 & \cdots & 0 & 1 \\ 0 & 0 & \cdots & 1 & 0 \\ \vdots & \vdots & \ddots & \vdots & \vdots \\ 0 & 1 & \cdots & 0 & 0 \\ 1 & 0 & \cdots & 0 & 0 \end{pmatrix}_{(n-k) \times (n-k)} \end{pmatrix} \quad (16)$$

That is, each of the basis conversion matrices $D_{ds}$ and $D_{sd}$ is an n×n matrix and composed of "n" number of 1s.

When the defining polynomial is a pentanomial having a particular form expressed by Formula (15), the basis conversion matrices $D_{ds}$ and $D_{sd}$ are respectively expressed by Formulae (17) and (18).

$$D_{sd} = \begin{pmatrix} \begin{pmatrix} 1 & \cdots & 0 & 1 \\ 0 & \cdots & 1 & 0 \\ \vdots & \ddots & \vdots & \vdots \\ 1 & \cdots & 0 & 0 \end{pmatrix}_{(k+1)\times(k+1)} & 0 \\ 0 & \begin{pmatrix} 0 & 0 & 0 & \cdots & 0 & 0 & 1 \\ 0 & 0 & 0 & \cdots & 0 & 1 & 0 \\ 0 & 0 & 0 & \cdots & 1 & 0 & 0 \\ \vdots & \vdots & \vdots & \ddots & \vdots & \vdots & \vdots \\ 0 & 0 & 1 & \cdots & 0 & 0 & 0 \\ 0 & 1 & 0 & \cdots & 0 & 0 & 0 \\ 1 & 0 & 0 & \cdots & 0 & 0 & 1 \end{pmatrix}_{(n-k-1)\times(n-k-1)} \end{pmatrix} \quad (17)$$

$$D_{ds} = \begin{pmatrix} \begin{pmatrix} 0 & \cdots & 0 & 1 \\ 0 & \cdots & 1 & 0 \\ \vdots & \ddots & \vdots & \vdots \\ 1 & \cdots & 0 & 1 \end{pmatrix}_{(k+1)\times(k+1)} & 0 \\ 0 & \begin{pmatrix} 1 & 0 & 0 & \cdots & 0 & 0 & 1 \\ 0 & 0 & 0 & \cdots & 0 & 1 & 0 \\ 0 & 0 & 0 & \cdots & 1 & 0 & 0 \\ \vdots & \vdots & \vdots & \ddots & \vdots & \vdots & \vdots \\ 0 & 0 & 1 & \cdots & 0 & 0 & 0 \\ 0 & 1 & 0 & \cdots & 0 & 0 & 0 \\ 1 & 0 & 0 & \cdots & 0 & 0 & 0 \end{pmatrix}_{(n-k-1)\times(n-k-1)} \end{pmatrix} \quad (18)$$

That is, each of the basis conversion matrices $D_{ds}$ and $D_{sd}$ is an n×n matrix and composed of n+2 number of 1s.

Since a trinomial or pentanomial is usually used as a defining polynomial in finite fields used in practical applications, the basis conversion matrices provided by the second conventional technique are very useful. However, these basis conversion matrices can be used for the trinomial and the pentanomial respectively having a particular form expressed by Formulae (14) and (15), but cannot be used for a pentanomial having a general form. However, the present invention provides a basis conversion matrix and method for a polynomial having a general form.

The third conventional technique relating to a method of calculating a basis conversion matrix provides a method of calculating a basis conversion matrix in an arbitrary finite field $GF(2^n)$. Here, $\{1, \alpha, \alpha^2, \ldots, \alpha^{n-1}\}$ is a standard basis of $GF(2^n)$, and a defining polynomial is expressed by Formula (19).

$$f(x) = x^n + x^{k(s)} + x^{k(s-1)} + \ldots + x^{k(1)} + 1 \quad (19)$$

After obtaining $\beta$, as shown in Formula (20), a basis conversion matrix $D_{ds}$ for converting a dual representation to a standard representation is obtained using Formula (21).

$$\beta = (f'(\alpha)\alpha\text{hu } n^t)^{-1}, \ t = [s/2] \quad (20)$$

$$D_{ds} = \begin{pmatrix} Tr(\beta \cdot \alpha^0) & Tr(\beta \cdot \alpha^1) & \cdots & Tr(\beta \cdot \alpha^{n-1}) \\ Tr(\beta \cdot \alpha^1) & Tr(\beta \cdot \alpha^2) & \cdots & Tr(\beta \cdot \alpha^n) \\ \vdots & \vdots & \ddots & \vdots \\ Tr(\beta \cdot \alpha^{n-1}) & Tr(\beta \cdot \alpha^n) & \cdots & Tr(\beta \cdot \alpha^{2n-2}) \end{pmatrix} \quad (21)$$

However, since $\beta$ is generated using a nonlinear method to k(i), the basis conversion matrix $D_{ds}$ cannot be easily represented with respect to k(i). In addition, the basis conversion matrix $D_{ds}$ is made without considering the complexity of its inverse matrix $D_{sd}$, so the inverse matrix $D_{sd}$ may be very complex in some cases. However, the present invention provides a basis conversion matrix $D_{sd}$ selected using a linear method to k(i) and basis conversion matrices $D_{ds}$ and $D_{sd}$, which are easily defined by k(i), when the defining polynomial is a pentanomial.

SUMMARY OF THE INVENTION

The present invention provides a basis conversion matrix and method, which are applied to a pentanomial having a general form in an arbitrary degree as a defining polynomial.

The present invention also provides an apparatus for basis conversion by which the basis conversion method is performed.

According to a feature of an embodiment of the present invention, there is provided a method of converting a standard representation to a dual representation in a finite field $GF(2^n)$, in which a standard basis represented coefficient vector $B=(b_0, b_1, b_2, \ldots, b_{n-1})$ of an element B of the finite field $GF(2^n)$ is converted to a dual basis represented coefficient vector $B'=(b'_0, b'_1, b'_2, \ldots, b'_{n-1})$ using a defining polynomial $x^n + x^{k(3)} + x^{k(2)} + x^{k(1)} + 1$. The method is performed by an apparatus for basis conversion. The apparatus includes a token register composed of "n" bits to store each row vector in a basis conversion matrix, a data register composed of "n" bits to store a vector to be converted, "n" number of bit multipliers performing bit-by-bit multiplications between the outputs of the token register and the outputs of the data registers, and an adder connected to the output terminals of the bit multipliers to add the results of the bit-by-bit multiplications. The method includes inputting the exponents n, k(3), k(2), and k(1) of the defining polynomial $x^n + x^{k(3)} + x^{k(2)} + x^{k(1)} + 1$; storing the standard basis represented coefficient vector $B=(b_0, b_1, b_2, \ldots, b_{n-1})$ to be converted in the data register; obtaining 0-th through k(1)-th components of the dual basis represented coefficient vector B' using a vector formula $(b'_0, b'_1, b'_2, \ldots, b'_{k(1)})=(b_0+b_{k(1)}, b_{k(1)-1}, b_{k(1)-2}, \ldots, b_0)$; obtaining (k(1)+1)-th through (k(1)+n−k(3))-th components of the dual basis represented coefficient vector B' using a vector formula $(b'_{k(1)+1}, b'_{k(1)+2}, \ldots, b'_{k(1)+n-k(3)})=(b_{n-1}, b_{n-2}, \ldots, b_{k(3)})$; obtaining (k(1)+1+n−k(3))-th through (k(1)+n−k(2))-th components of the dual basis represented coefficient vector B' using a vector formula $(b'_{k(1)+1+n-k(3)}, b'_{k(1)+2+n-k(3)}, \ldots, b'_{k(1)+n-k(2)})=(b_{k(3)-1}+b_{k(3)-2}+b_{n-2}, \ldots, b_{k(2)}+b_{n-k(3)+k(2)})$; and obtaining (k(1)+1+n−k(2))-th through (n−1)-th components of the dual basis represented coefficient vector B' using a vector formula $(b'_{k(1)+1+n-k(2)}, b'_{k(1)+2+n-k(2)}, \ldots, b'_{n-1})=(b_{k(2)-1}+b_{n-1-k(3)+k(2)}+b_{n-1}, b_{k(2)-2}+b_{n-2-k(3)+k(2)}+b_{n-2}, \ldots, b_{k(1)+1}+b_{n+1-k(3)+k(1)}+b_{n+1-k(2)+k(1)})$.

According to another feature of an embodiment of the present invention, there is provided a method of converting a dual representation to a standard representation in a finite field $GF(2^n)$, in which a dual basis represented coefficient vector $B'=(b'_0, b'_1, b'_2, \ldots, b'_{n-1})$ of an element B of the finite field $GF(2^n)$ is converted to a standard basis represented coefficient vector $B=(b_0, b_1, b_2, \ldots, b_{n-1})$ using a defining polynomial $x^n+x^{k(3)}+x^{k(2)}+x^{k(1)}+1$. The method is performed by an apparatus for basis conversion. The apparatus includes a token register composed of "n" bits to store each row vector in a basis conversion matrix, a data register composed of "n" bits to store a vector to be converted, "n" number of bit multipliers performing bit-by-bit multiplications between the outputs of the token register and the outputs of the data registers, and an adder connected to the output terminals of the bit multipliers to add the results of the bit-by-bit multiplications. The method includes inputting the exponents n, k(3), k(2), and k(1) of the defining polynomial; storing the dual basis represented coefficient vector $B'=(b'_0, b'_1, b'_2, \ldots, b'_{n-1})$ to be converted in the data register; obtaining 0-th through k(1)-th components of the standard basis represented coefficient vector B using a vector formula $(b_0, b_1, \ldots, b_{k(1)-1}, b_{k(1)})=(b'_{k(1)}, b'_{k(1)-1}, \ldots, b'_1, b'_0+b'_{k(1)})$; obtaining (k(1)+1)-th through (k(2)-1)-th components of the standard basis represented coefficient vector B using a vector formula $(b_{k(1)+1}, b_{k(1)+2}, \ldots, b_{k(2)-1})=(b'_{k(2)-1}+b'_{k(3)-1}+b'_{n-1}, b'_{k(2)-2}+b'_{k(3)-2}+b'_{n-2}, \ldots, b'_{k(1)+1}+b'_{k(1)+1+k(3)-k(2)})$; obtaining k(2)-th through (k(3)-1)-th components of the standard basis represented coefficient vector B using a vector formula $(b_{k(2)}, b_{k(2)+1}, \ldots, b_{k(3)-1})=(b'_{k(1)+k(3)-k(2)}+b'_{n+k(1)-k(2)}, b'_{k(1)+k(3)-k(2)-1}+b'_{n+k(1)-k(2)-1}, \ldots, b'_{k(1)+1}+b'_{n+1+k(1)-k(3)})$; and obtaining k(3)-th through (n-1)-th components of the standard basis represented coefficient vector B using a vector formula $(b_{k(3)}, b_{k(3)+1}, \ldots, b_{n-1})=(b'_{n+k(1)-k(3)}, b'_{n+k(1)-k(3)-1}, \ldots, b'_{k(1)+1})$.

According to still another feature of an embodiment of the present invention, there is provided an apparatus for basis conversion between a standard basis and a dual basis in a finite field $GF(2^n)$, by which conversion between a standard basis represented coefficient vector $B=(b_0, b_1, b_2, \ldots, b_{n-1})$ of an element B of the finite field $GF(2^n)$ and a dual basis represented coefficient vector $B'=(b'_0, b'_1, b'_2, \ldots, b'_{n-1})$ is performed using a basis conversion matrix determined in accordance with a defining polynomial $x^n+x^{k(3)}+x^{k(2)}+x^{k(1)}+1$. The apparatus includes a token register, which is composed of "n" shift registers classified into an upper token register with (k(1)+1) bits and a lower token register with (n-k(1)-1) bits, each shift register shifting input data to the left by one bit at each clock in response to an enable signal and a clock, wherein the outputs of the shift registers respectively correspond to the components of each row in the basis conversion matrix; a token controller, which receives the exponents n, k(3), k(2), and k(1) of the defining polynomial and outputs an (n-1)-bit input selection signal, the enable signal for activating the shift operation of the token register, a clock for the token register, initial values for the respective upper and lower token registers, a data input signal to a k(1)-th register of the token register, and a data input signal to an (n-1)-th register of the token register; a multiplexer, which separates the upper token register from the lower token register according to the value of k(1) in response to the input selection signal and selects a data input path for the token register; a data register, which stores a coefficient vector to be converted; an AND gate unit, which performs bit-by-bit multiplication on the output of the token register and the output of the data register; an XOR gate, which adds all of the outputs of the AND gate unit; and an output register, which is connected to the XOR gate and synchronizes the output of the XOR gate with the clock.

BRIEF DESCRIPTION OF THE DRAWINGS

The above and other features and advantages of the present invention will become more apparent by describing in detail preferred embodiments thereof with reference to the attached drawings in which:

FIG. 5 is a flowchart of an embodiment of a basis conversion method for converting a dual representation to a standard representation according to the present invention.

DETAILED DESCRIPTION OF THE INVENTION

Figure 1:
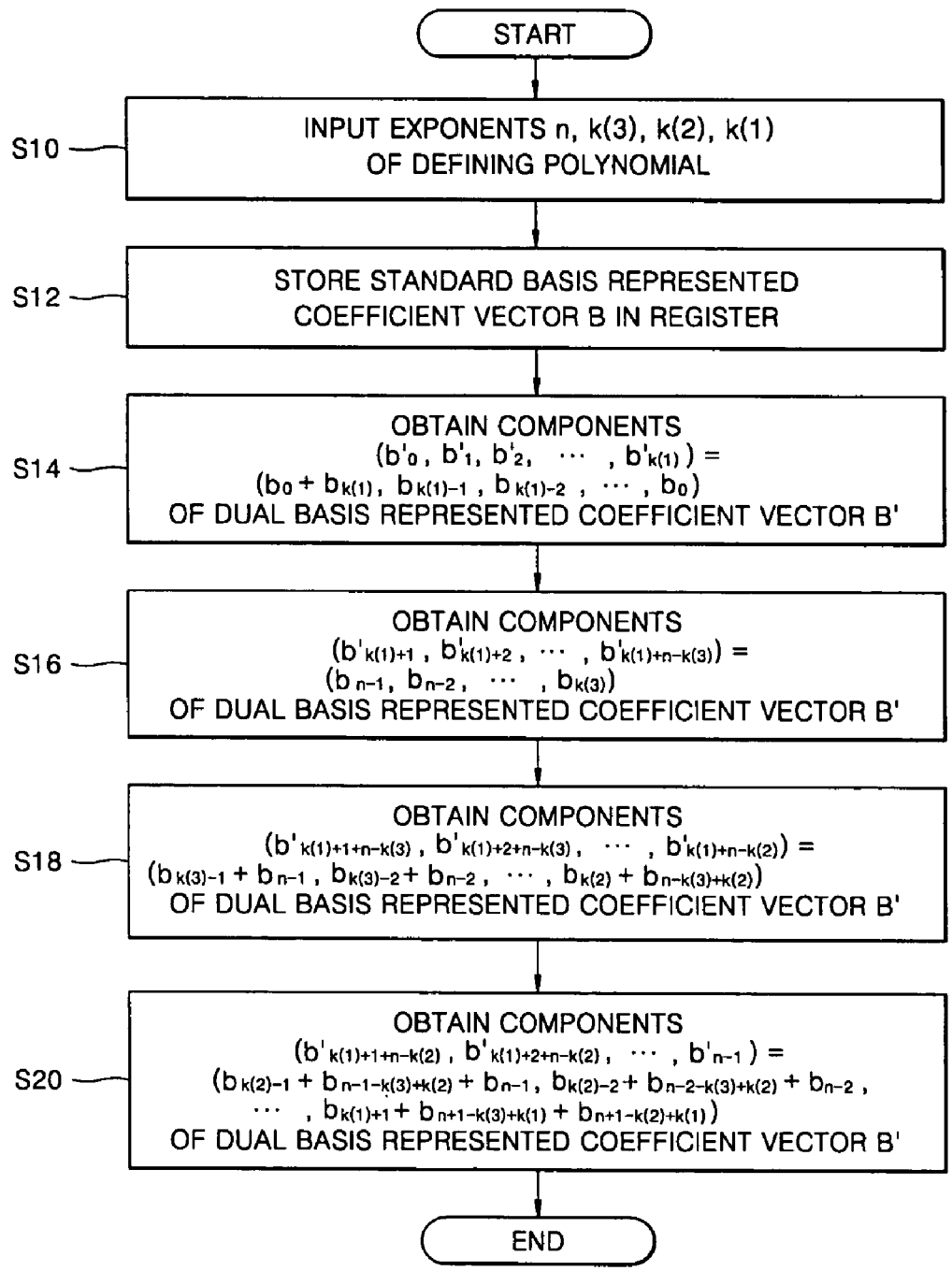
FIG. 1 is a flowchart of an embodiment of a basis conversion method for converting a standard representation to a dual representation according to the present invention.

Korean Patent Application No. 2002-69460, filed on Nov. 9, 2002, and entitled, "Method And Apparatus For Basis Conversion In Finite Field," is incorporated by reference herein in its entirety.

Hereinafter, for clarity of the description, in an n×n square matrix, 0-th through (n-1)-th rows are sequentially arranged as follows.

$$\begin{pmatrix} 1 & 1 & \cdots & 0 & 0 \\ 1 & 0 & \cdots & 0 & 0 \\ \vdots & \vdots & \ddots & \vdots & \vdots \\ 0 & 0 & \cdots & 0 & 1 \\ 0 & 0 & \cdots & 1 & 0 \end{pmatrix}_{n \times n} \quad \begin{matrix} \text{0-th row} \\ \text{first row} \\ \vdots \\ (n-2)\text{-th row} \\ (n-1)\text{-th row} \end{matrix}$$

In order to multiply two arbitrary elements of a finite field $GF(2^n)$ by each other, each element needs to be represented with respect to a certain basis. There are various representation methods, but representative methods have been described above. When $\alpha$ is an element of the finite field $GF(2^n)$, a standard basis SB is expressed by Formula (22). DB is a duel basis with respect to a trace function $f(=Tr(\delta))$ of the standard basis SB and is expressed by Formula (23).

$$SB=\{\alpha^i | i=0,1,\ldots,n-1\} \quad (22)$$

$$DB=\{\beta_i | i=0,1,\ldots,n-1\} \quad (23)$$

In basis conversion between coefficient vectors $A=(a_0, a_1, a_2, \ldots, a_{n-1})$ and $B=(b_0, b_1, b_2, \ldots, b_{n-1})$ of respective elements A and B represented with the standard basis SB of the finite field $GF(2^n)$ and respective coefficient vectors $A'=(a'_0, a'_1, a'_2, \ldots, a'_n)$ and $B'=(b'_0, b'_1, b'_2, \ldots, b'_n)$ of the respective elements A and B represented with the dual basis DB of the finite field $GF(2^n)$, the elements A and B are expressed by Formula (24).

$$A = \sum_{i=0}^{n-1} a_i \alpha^i = \sum_{i=0}^{n-1} a'_i \beta_i \quad (24)$$

-continued $$B = \sum_{i=0}^{n-1} b_i \alpha^i = \sum_{i=0}^{n-1} b'_i \beta_i$$

When the two elements A and B of the finite field are multiplied by each other based on Formula (24), an i-th coefficient of C=AB in a dual representation is expressed by Formula (25).

$$[AB]_i = \left[ A \sum_{j=0}^{n-1} b_j \alpha^j \right]_i = \sum_{j=0}^{n-1} b_j [\alpha^j A]_i \quad (25)$$

That is, the i-th coefficient of C=AB in the dual representation is expressed as the sum of products of the coefficients of the standard basis SB of the element B and the coefficients of the dual basis DB of $\alpha^j A$. Accordingly, C=AB in the dual representation can be expressed by Formula (26).

$$\begin{pmatrix} f(A) & f(A\alpha^1) & \cdots & f(A\alpha^{n-1}) \\ f(A\alpha^1) & f(A\alpha^2) & \cdots & f(A\alpha^n) \\ \vdots & \vdots & \ddots & \vdots \\ f(A\alpha^{n-1}) & f(A\alpha^n) & \cdots & f(A\alpha^{2n-2}) \end{pmatrix} \begin{pmatrix} b_0 \\ b_1 \\ \vdots \\ b_{n-1} \end{pmatrix} = \begin{pmatrix} f(C) \\ f(C\alpha) \\ \vdots \\ f(C\alpha^{n-1}) \end{pmatrix} \quad (26)$$

As described above, for multiplication of the two elements A and B, the coefficients of the element B in the standard basis SB and the coefficients of the element A in the dual basis DB are necessary, and the result of the multiplication is a coefficient in the dual basis DB. Accordingly, regardless of whether input and output values are represented in the standard basis SB or the dual basis DB, basis conversion is necessary. The basis conversion is implemented by multiplication of matrices. Here, a matrix for converting a dual representation to a standard representation and a matrix for converting a standard representation to a dual representation are in inverse relation to each other. When the element A has a value of 1, a standard representation for the element B is converted to a dual representation. In other words, a dual representation B' for the element B with respect to "f" is obtained by performing multiplication of matrices, as shown in Formula (27).

$$\begin{pmatrix} b'_0 \\ b'_1 \\ \vdots \\ b'_{n-1} \end{pmatrix} = \begin{pmatrix} f(\alpha^0) & f(\alpha^1) & \cdots & f(\alpha^{n-1}) \\ f(\alpha^1) & f(\alpha^2) & \cdots & f(\alpha^n) \\ \vdots & \vdots & \ddots & \vdots \\ f(\alpha^{n-1}) & f(\alpha^n) & \cdots & f(\alpha^{2n-2}) \end{pmatrix} \begin{pmatrix} b_0 \\ b_1 \\ \vdots \\ b_{n-1} \end{pmatrix} \quad (27)$$

The present invention provides an efficient basis conversion matrix based on the lemma that when the standard basis SB={$\alpha^i$|i=0, 1, . . . , n−1} and an arbitrary vector v∈{0, 1}$^n$ are given, there exists a linear functional "f" satisfying v=(f(1), f($\alpha$), . . . , f($\alpha^{n-1}$)).

A basis conversion matrix is determined by the first column vector of Formula (27). Accordingly, in order to obtain a matrix having a small number of 1s, the first column vector may be appropriately selected based on the above-described lemma. In the finite field GF(2$^n$) with a defining polynomial expressed by Formula (28), the first column vector of the basis conversion matrix is set as Formula (29).

$$x^n + x^{k(s)} + x^{k(s-1)} + \ldots + x^{k(1)} + 1 \quad (28)$$

$$f(\alpha^i) = 0(i \neq 0, k(1)), f(\alpha^0) = 1, f(\alpha^{k(1)}) = 1 \quad (29)$$

When the components of the vector "v" are selected according to Formula (29), a basis conversion matrix $D_{sd}$ for converting a standard representation to a dual representation is expressed by Formula (30).

$$D_{sd} = \begin{pmatrix} \begin{pmatrix} \cdot & \cdot \\ \cdot & \cdot \end{pmatrix}_{(k(1)+1) \times (k(1)+1)} & 0 \\ 0 & \begin{pmatrix} \cdot & \cdot & \cdot \\ \cdot & \cdot & \cdot \\ \cdot & \cdot & \cdot \end{pmatrix}_{(n-k(1)-1) \times (n-k(1)-1)} \end{pmatrix} \quad (30)$$

An inverse matrix $D_{ds}$, for converting a dual representation to a standard representation, of the basis conversion matrix $D_{sd}$ is also expressed by Formula (30).

FIG. 1 is a flowchart of an embodiment of a basis conversion method for converting a standard representation to a dual representation according to the present invention. In step S10, the exponents n, k(3), k(2), and (k1) of a defining polynomial are input. In step S12, a standard basis coefficient vector B to be subjected to basis conversion is stored in a register. In steps S14 through S20, the coefficient vector B is converted to a dual basis represented coefficient vector B'.

The present invention provides basis conversion matrices $D_{sd}$ and $D_{ds}$ and a basis conversion method for a case where a defining polynomial is a pentanomial defined by Formula (31) and satisfies the condition shown in Formula (32).

$$x^n + x^{k(3)} + x^{k(2)} + x^{k(1)} + 1 \quad (31)$$

$$n - k(3) > k(3) - k(1) \quad (32)$$

More specifically, the exponents n, k(3), k(2), and (k1) of the defining polynomial defined by Formula (31) are input in step S10.

In most practically used finite fields GF(2$^n$), a trinomial or pentanomial is used as the defining polynomial. In addition, since the values of k(1), k(2), and k(3) are usually smaller than the value of "n", the effect of the condition with respect to k(i) shown in Formula (32) affects the practicality of the present invention only minimally.

The basis conversion matrix $D_{sd}$ shown in Formula (30) can be simply rewritten by Formula (33).

$$D_{sd} = \begin{pmatrix} [D_{sd}]_U & 0 \\ 0 & [D_{sd}]_L \end{pmatrix} \quad (33)$$

When the defining polynomial of a finite field GF(2$^n$) is determined according to Formulae (31) and (32), $[D_{sd}]_U$ and $[D_{sd}]_L$ are defined by Formulae (34) and (35), respectively, based on Formula (29).

$$[D_{sd}]_U = \begin{pmatrix} 1 & 0 & \cdots & 0 & 1 \\ 0 & 0 & \cdots & 1 & 0 \\ \vdots & \vdots & \ddots & \vdots & \vdots \\ 0 & 1 & \cdots & 0 & 0 \\ 1 & 0 & \cdots & 0 & 0 \end{pmatrix}_{(k(1)+1) \times (k(1)+1)} \quad (34)$$

$$[D_{sd}]_L = \begin{pmatrix} & & & & & 1 \\ & & & & 1 & \\ & & & 1 & & 1 \\ & & \cdots & & 1 & \\ & 1 & \cdots & & 1 & \\ 1 & 1 & & \cdots & & \\ 1 & 1 & 1 & & & \end{pmatrix}_{(n-k(1)-1) \times (n-k(1)-1)} \quad (35)$$

All of the elements of $[D_{sd}]_L$ except for 1s shown in Formula (35) are 0s. In $[D_{sd}]_L$, $(n-k(1)-1)$ number of 1s exist on the longest anti-diagonal, and $(k(3)-k(2)-1)$ number of 1s and $(k(2)-k(1)-1)$ number of 1s exist on the remaining two anti-diagonals, respectively. Accordingly, the basis conversion matrix $D_{sd}$ has a total $(n+k(3)-k(1)+k(2)-k(1)-1)$ number of 1s including the number of 1s in the above square matrix shown in Formulae (34) and (35). In addition, the anti-diagonals of $[D_{sd}]_L$ respectively start at the $(k(1)+1)$-th, $(k(1)+1+n-k(3))$-th, and $(k(1)+1+n-k(2))$-th rows of the basis conversion matrix $D_{sd}$. If $k(2)-k(i)=1$, the shortest third anti-diagonal having $(k(2)\Delta k(1)-1)$ number of 1s does not appear. As described above, the basis conversion matrix $D_{sd}$ is easily expressed linearly with respect to $k(t)$ and "n". This means that a basis conversion matrix does not need to be stored.

Consequently, in step S10, by inputting the exponents n, $k(3)$, $k(2)$, and $k(1)$ of the defining polynomial which is a pentanomial, the basis conversion matrix $D_{sd}$ is determined based on the above-described theory.

In step S12, a standard basis represented coefficient vector $B=(b_0, b_1, b_2, \ldots, b_{n-1})$ of an element B of the finite field is stored in a register.

Next, steps S14 through S20 relate to conversion of a coefficient vector for obtaining the components of a dual basis represented coefficient vector. Conversion formulae used in steps S14 through S20 are determined based on the basis conversion matrix $D_{sd}$ determined in step S10.

The following description concerns an operation of converting a standard basis represented coefficient vector to a dual basis represented coefficient vector. Formula (36) shows a relationship between the standard basis represented coefficient vector $B=(b_0, b_1, b_2, \ldots, b_{n-1})$ and the dual basis represented coefficient vector $B'=(b'_0, b'_1, b'_2, \ldots, b'_{n-1})$ in the finite field $GF(2^n)$.

$$B' = D_{sd} \cdot B$$

$$\begin{pmatrix} B'_U \\ B'_L \end{pmatrix} = \begin{pmatrix} [D_{sd}]_U & 0 \\ 0 & [D_{sd}]_L \end{pmatrix} \cdot \begin{pmatrix} B_U \\ B_L \end{pmatrix} \quad (36)$$

The rows of the basis conversion matrix $D_{sd}$ can be divided into the square matrix $[D_{sd}]_U$ composed of 0-th through $k(1)$-th rows in a size of $(k(1)+1) \times (k(1)+1)$ and the square matrix $[D_{sd}]_L$ composed of $(k(1)+1)$-through $(n-1)$-th rows in a size of $(n-k(1)-1) \times (n-k(1)-1)$.

In step S14, the 0-th through $k(1)$-th components $[b'_0, b'_1, \ldots, b'_{k(1)}]^T$ of the dual basis represented coefficient vector B' are obtained using Formula (37). Here, $[D_{sd}]_U$ is the same as shown in Formula (34).

$$B'_U = [D_{sd}]_U \cdot B_U \quad (37)$$

As the result of performing step S14, the result of Formula (37) is expressed by Formula (38).

$$\begin{pmatrix} b'_0 \\ b'_1 \\ \vdots \\ b'_{k(1)-1} \\ b'_{k(1)} \end{pmatrix} = \begin{pmatrix} b_0 + b_{k(1)} \\ b_{k(1)-1} \\ \vdots \\ b_1 \\ b_0 \end{pmatrix} \quad (38)$$

In steps S16 through S20, the $(k(1)+1)$-th through $(n-1)$-th components of the dual basis represented coefficient vector B' are obtained using Formula (39). Here, $[D_{sd}]_L$ is the same as shown in Formula (35).

$$B'_L = [D_{sd}]_L \cdot B_L$$

$$\begin{pmatrix} b'_{k(1)+1} \\ b'_{k(1)+2} \\ \vdots \\ b'_{k(1)+1+n-k(3)} \\ b'_{k(1)+2+n-k(3)} \\ \vdots \\ b'_{k(1)+1+n-k(2)} \\ b'_{k(1)+2+n-k(2)} \\ \vdots \\ b'_{n-1} \end{pmatrix} = [D_{sd}]_L \cdot \begin{pmatrix} b_{k(1)+1} \\ b_{k(1)+2} \\ \vdots \\ b_{k(1)+1+n-k(3)} \\ b_{k(1)+2+n-k(3)} \\ \vdots \\ b_{k(1)+1+n-k(2)} \\ b_{k(1)+2+n-k(2)} \\ \vdots \\ b_{n-1} \end{pmatrix} \quad (39)$$

As shown in Formula (35), the rows in $[D_{sd}]_L$ can be classified into rows having a single 1, rows having two 1s, and rows having three 1s. Accordingly, steps for implementing the right side of conversion Formula (39) may be classified into step S16 having a single term, step S18 having two terms, and step S20 having three terms. In other words, the 0-th through $k(1)$-th components of the dual basis represented coefficient vector B' are obtained in step S14, the $(k(1)+1)$-th through $(k(1)+n-k(3))$-th components of the dual basis represented coefficient vector B' are obtained in step S16, the $(k(1)+1+n-k(3))$-th through $(k(1)+n-k(2))$-th components of the dual basis represented coefficient vector B' are obtained in step S18, and the $(k(1)+1+n-k(2))$-th through $(n-1)$-th components of the dual basis represented coefficient vector B' are obtained in step S20. Consequently, the basis conversion result obtained by performing steps S14 through S20 is expressed by Formula (40).

$$\begin{pmatrix} b'_{k(1)+1} \\ b'_{k(1)+2} \\ \vdots \\ b'_{k(1)+1+n-k(3)} \\ b'_{k(1)+2+n-k(3)} \\ \vdots \\ b'_{k(1)+1+n-k(2)} \\ b'_{k(1)+2+n-k(2)} \\ \vdots \\ b'_{n-1} \end{pmatrix} = \begin{pmatrix} b_{n-1} \\ b_{n-2} \\ \vdots \\ b_{k(3)-1} + b_{n-1} \\ b_{k(3)-2} + b_{n-2} \\ \vdots \\ b_{k(2)-1} + b_{n-1-k(3)+k(2)} + b_{n-1} \\ b_{k(2)-2} + b_{n-2-k(3)+k(2)} + b_{n-2} \\ \vdots \\ b_{k(1)+1} + b_{n+1-k(3)+k(1)} + b_{n+1-k(2)+k(1)} \end{pmatrix} \quad (40)$$

The following description concerns how a basis conversion method of the present invention is applied to a coefficient vector $B=(b_0, b_1, \ldots, b_{12})$ of an element B of a finite field $GF(2^{13})$ with a defining polynomial expressed by Formula (41).

$$x^{13}+x^6+x^4+x+1 \quad (41)$$

Here, a basis conversion matrix $D_{sd}$ for converting a standard representation to a dual representation is a 13×13 square matrix expressed by Formula (42).

$$B'=D_{sd} \cdot B$$

$$\begin{pmatrix} B'_U \\ B'_L \end{pmatrix} = \begin{pmatrix} [D_{sd}]_U & 0 \\ 0 & [D_{sd}]_L \end{pmatrix} \cdot \begin{pmatrix} B_U \\ B_L \end{pmatrix} \quad (42)$$

The 2×2 matrix $[D_{sd}]_U$ and the 11×11 matrix $[D_{sd}]_L$ are separately subjected to matrix calculation as shown in Formulae (43) and (44). In Formula (44), all of the elements not shown in the matrix $[D_{sd}]_L$ are 0.

$$B'_U = [D_{sd}]_U \cdot B_U$$

$$\begin{pmatrix} b'_0 \\ b'_1 \end{pmatrix} = \begin{pmatrix} 1 & 1 \\ 0 & 0 \end{pmatrix} \cdot \begin{pmatrix} b_0 \\ b_1 \end{pmatrix} = \begin{pmatrix} b_0+b_1 \\ b_0 \end{pmatrix} \quad (43)$$

$$B'_L = [D_{sd}]_L \cdot B_L$$

$$[D_{sd}]_L = \begin{pmatrix} & & & & & & 1 \\ & & & & & 1 & \\ & & & & 1 & & \\ & & & \cdots & & & 1 \\ & & 1 & & & 1 & 0 \\ & 1 & & & & 1 & 0 & 1 \\ 1 & & & & 1 & 0 & 1 & 0 \end{pmatrix} \quad (44)$$

-continued $$\begin{pmatrix} b'_2 \\ b'_3 \\ b'_4 \\ b'_5 \\ b'_6 \\ b'_7 \\ b'_8 \\ b'_9 \\ b'_{10} \\ b'_{11} \\ b'_{12} \end{pmatrix} = \begin{pmatrix} b_{12} \\ b_{11} \\ b_{10} \\ b_9 \\ b_8 \\ b_7 \\ b_6 \\ b_5 + b_{12} \\ b_4 + b_{11} \\ b_3 + b_{10} + b_{12} \\ b_2 + b_9 + b_{11} \end{pmatrix}$$

Figure 2:
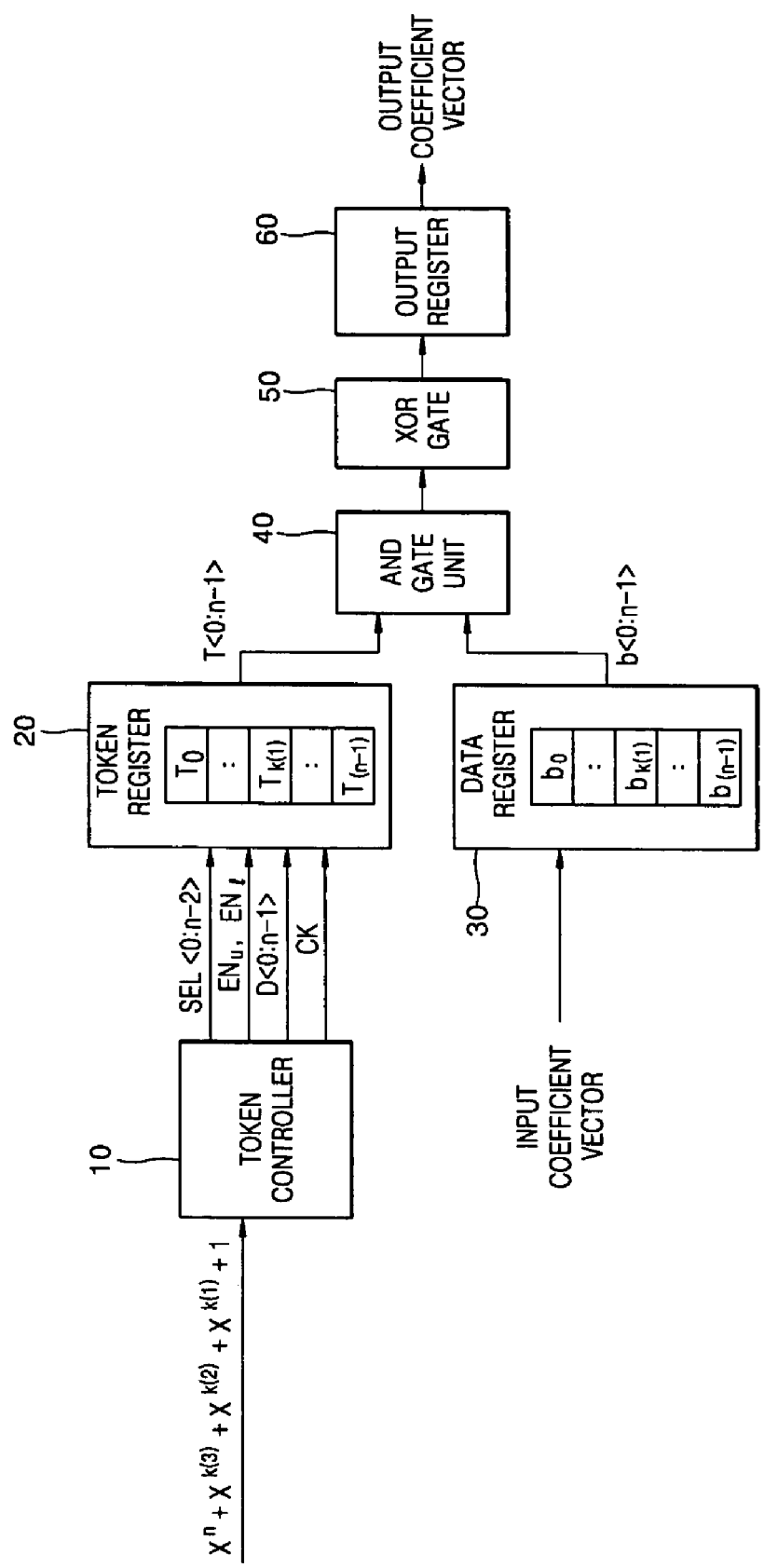
FIG. 2 illustrates a diagram of an embodiment of an apparatus for basis conversion by which the basis conversion method shown in FIG. 1 is performed, according to the present invention.

FIG. 2 illustrates a diagram of an embodiment of an apparatus for basis conversion, by which the basis conversion method shown in FIG. 1 is performed, according to the present invention. The apparatus for basis conversion includes a token register 20, which is composed of "n" bits and outputs components of each row of a basis conversion matrix; a token controller 10, which outputs to the token register 20 control signals SEL<0:n−2>, $EN_u$, and $EN_l$ for controlling the token register 20, data D<0:n−1> and a shift clock CK. The control signal SEL<0:n−2> is used for input selection. The apparatus for basis conversion further includes a data register 30, which is composed of "n" bits and stores the components of a vector to be converted; an AND gate unit 40, which is composed of "n" number of AND gates in order to multiply the n-bit output of the token register 20 by the n-bit output of the data register 30 bit-by-bit; an XOR gate 50, which is connected to the AND gate unit 40 and performs a bit addition on the "n" outputs of the AND gate unit 40; and an output register 60, which is selectively provided and outputs the result of the basis conversion in synchronization with a clock signal.

Figure 4:
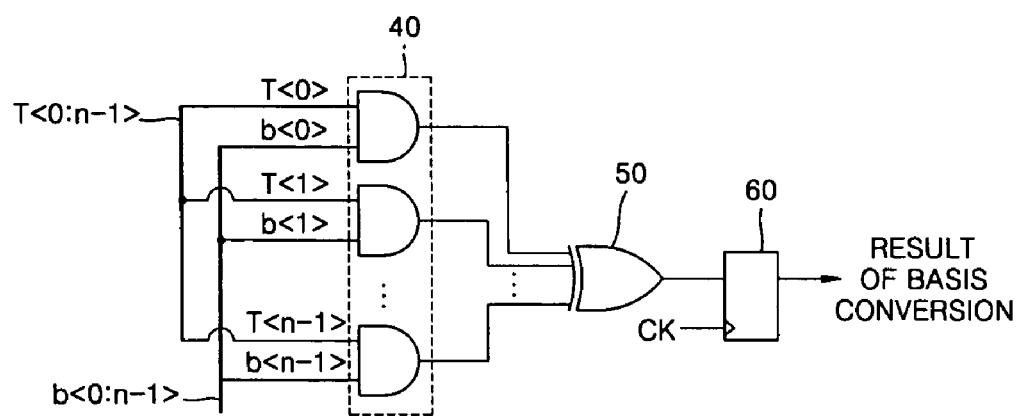
FIG. 4 illustrates a diagram of an embodiment of the structure of an AND gate, an XOR gate, and an output register shown in FIG. 2.

The AND gate unit 40, the XOR gate 50, and the output register 60 are illustrated in detail in FIG. 4.

Figure 3:
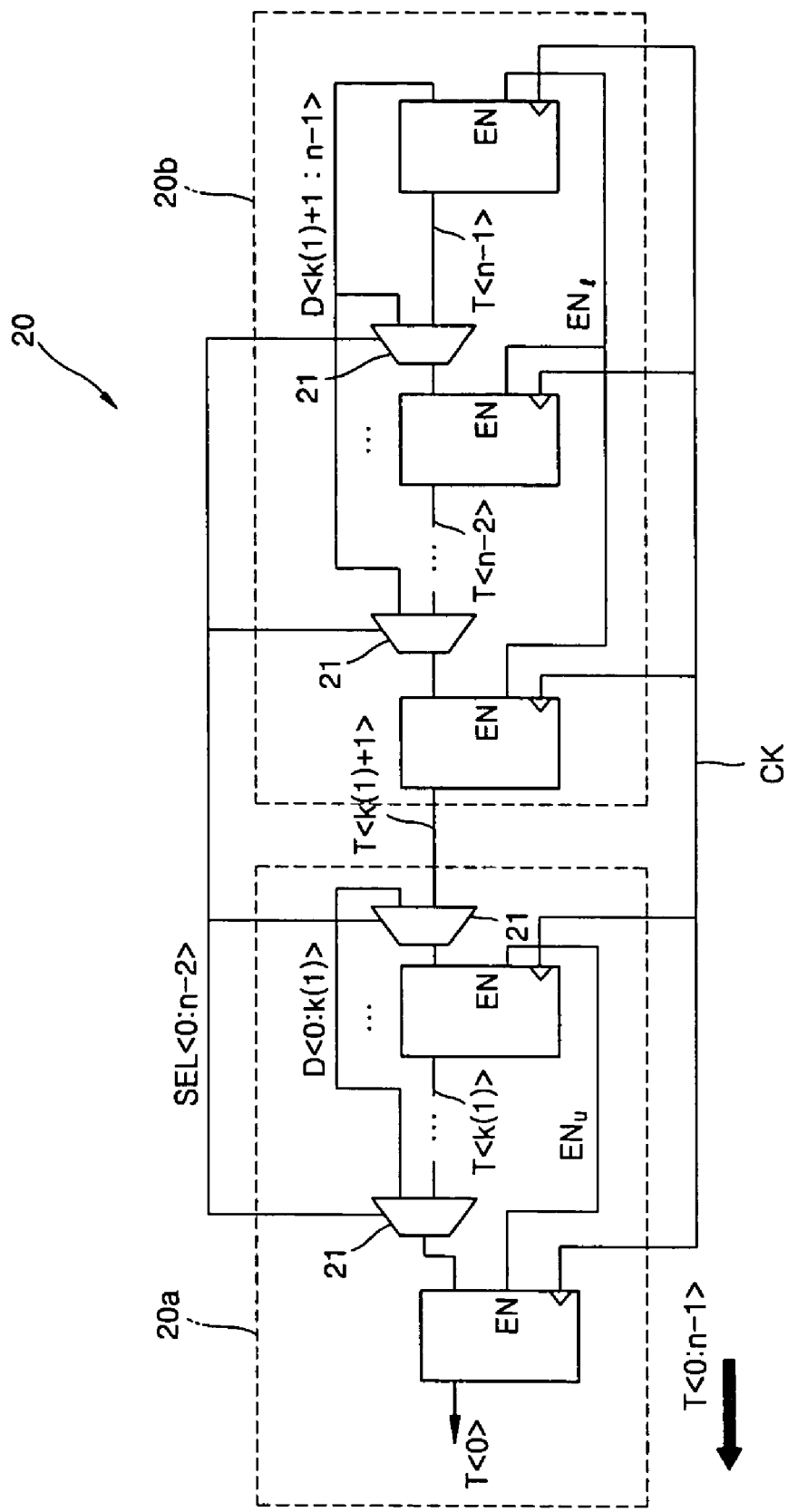
FIG. 3 illustrates a diagram of an embodiment of the internal structure of a token register shown in FIG. 2.

FIG. 3 is a diagram of an embodiment of the internal structure of the token register 20 shown in FIG. 2. The token register 20 includes an upper token register 20a composed of (k(1)+1) bits, a lower token register 20b composed of (n−k(1)−1) bits, and n−1 multiplexers 21, which divide the token register 20 into the upper token register 20a and the lower token register 20b and select data input paths for the token register 20.

Referring to FIGS. 2 and 3, the token register 20 is composed of "n" shift registers, which are classified into the upper token register 20a and the lower token register 20b. In the token register 20, in response to the enable signals $EN_u$, and $EN_l$ and the shift clock CK from the token controller 10, data is shifted to the left by one bit at each shift clock CK and then output. The outputs T<0:n−1> of the "n" shift registers at each shift clock CK are the values of the components of each row in the basis conversion matrix $D_{sd}$ or $D_{ds}$.

The multiplexers 21, of which there are (n−1), divide the token register 20 into the upper token register 20a and the lower token register 20b according to the value of k(1) in response to SEL<0:n−2>.

The token controller 10 receives the exponents n, k(3), k(2), and k(1) of a pentanomial as a defining polynomial and outputs SEL<0:n−2> for the (n−1) multiplexers 21, the enable signals $EN_u$, and $EN_l$ for activating the shift operation of the token register 20, the shift clock CK for the token register 20, and the data D<0:n−1> stored in the upper token register 20a and the lower token register 20b at each shift clock CK.

The data register 30 stores a coefficient vector B=($b_0$, $b_1$, $b_2$, . . . , $b_{n-1}$) of an element to be converted.

Multiplication between a basis conversion matrix and a coefficient vector is implemented by the AND gate unit 40 and the XOR gate 50. The AND gate unit 40 performs a bit multiplication of T<0:n−1> and D<0:n−1>. The XOR gate 50 adds the results of the bit multiplication performed by the AND gate unit 40.

The output register 60 is selectively provided for output synchronization. For example, when the components of each row are determined at 0-th through twelfth clocks, the output register 60 receives the components and outputs vector components at first through thirteenth clocks.

The following description concerns the conversion from a basis representation to a dual representation performed by an apparatus for basis conversion having the above-described structure according to the present invention.

According to an input value of a bit k(1), the 0-th through k(1)-th registers are classified into the upper token register 20a and the (k(1)+1)-th through (n−1)-th registers are classified into the lower token register 20b. Accordingly, the upper and lower token registers 20a and 20b are separately controlled. Here, the bit k(1) is the most significant bit (MSB) of the upper token register 20a. In other words, SEL<k(1)> of the k(1)-th multiplexer 21 is controlled such that an input value of the k(1)-th register is determined through an external path during the basis conversion. In addition, the (n−1)-th register corresponding to the MSB of the lower token register 20b is not connected to any one of the multiplexers 21 but always receives external data. When n=13 and k(1)=1,the upper token register 20a is composed of two shift registers, the lower token register 20b is composed of 11 shift registers, and 12 multiplexers 21 are provided except for the MSB of the lower token register 20b.

At the 0-th clock, a value 1 is input to SEL<0:k(1)> so that an initial value for the upper token register 20a is externally input. At the first through k(1)-th clocks, a value 1 is input to only SEL<k(1)> of the k(1)-th multiplexer, so the k(1)-th register continuously receives externally input values, and a value 0 is input to SEL<0:k(1)−1>, so each of the 0-th through (k(1)−1)-th registers shifts one bit output from the next register. For example, when k(1)=1, values (1 1) are input to SEL<0:1> at the 0-th clock, and values (0 1) are input to SEL<0:1> at the first clock. After the (k(1)+1)-th clock, the outputs of the upper token register 20a are maintained by an enable control, so SEL<0:k(1)> for the upper token register 20a is "don't care" from the (k(1)+2) clock.

The values of SEL<k(1)+1 :n−2> provided for all of the bits of the lower token register 20b except for the (n−1)-th bit are, for example, 1 at the (k(1)+1)-th clock so that the lower token register 20b is connected to external inputs D<k(1)+1 :n−1> at the (k(1)+1)-th clock. Starting from the (k(1)+2)-th clock, 0 is input to all of SEL<k(1)+1 :n−2> so that each of the registers in the lower token register 20b shifts a value output from the next register.

The outputs of the upper token register 20a and the lower token register 20b are controlled by the enable signals $EN_u$, and $EN_l$. The enable signals $EN_u$, and $EN_l$ are controlled to enable the token register 20 while desired values are output in response to the clock CK. The following description concerns an example of an enable control of the token register 20.

In an enable control for the upper token register 20a, the upper token register 20a is enabled at the 0-th clock in response to the enable signal $EN_u$, is maintained in an enabled state up to the (k(1)+1)-th clock, and disabled after the shift output of the upper token register 20 at the (k(1)+1)-th clock. For example, when k(1)=1, the upper token register 20a is enabled at the 0-th clock and outputs (1 1) in response to external inputs. At the first clock, the upper token register 20a outputs a shifted output 1 as the 0-th bit and outputs 0 as the k(1)-th bit, i.e., the first bit in response to an external input. Consequently, the upper token register 20 outputs (1 0). At the second clock, a shifted output 0 is output as the 0-th bit, and 0 is output as the first bit in response to an external input so that the upper token register 20a outputs (0 0). Starting from the third clock, the upper token register 20a is disabled, and thus the outputs (0 0) are maintained. The components of $[D_{sd}]_U$ respectively correspond to bits output from the upper token register 20a.

In an enable control for the lower token register 20b, all of the outputs of the lower token register 20b are 0 at the 0-th through k(1)-th clocks. The lower token register 20b may be designed to be enabled at the (k(1)+1)-th clock. When all of the registers in the apparatus commence operation, for example, all of the outputs of the lower token register 20b are 0 due to a global reset. At the (k(1)+1)-th clock, the lower token register 20b is enabled and starts shift operation. For example, when the defining polynomial is a pentanomial $x^{13}+x^6+x^4+x$ +1, n=13, k(3)=6, k(2)=4, and k(1)=1, the lower token register 20b outputs 0 at the 0-th and first clocks and is enabled at the second clock so as to output (0 0 . . . 0 1) in response to external inputs. The enabled state is maintained until the basis conversion is completed at the twelfth clock. At the third clock, the lower token register 20b outputs (0 0 . . . 1 0) by performing a 1-bit shift to the left. The 1-bit shift to the left is performed at each clock. A value 1 is input to the (n−1)-th register in the lower token register 20b at the (k(1)+1+n−k(3)=9)-th clock and the (k(1)+1+n−k(2)=11)-th clock, and a value 0 is input thereto at the other clocks. Then, as the shift clock increases, the upper token register 20a and the lower token register 20b have the values shown below. Here, the two bits in parenthesis are the outputs of the upper token register 20a and the following 11 bits are the outputs of the lower token register 20b for the 0-th through 12-th clocks.

| | |
|---|---|
| 0-th clock | (1 1) (0 0 0 0 0 0 0 0 0 0 0) |
| 1st clock | (1 0) (0 0 0 0 0 0 0 0 0 0 0) |
| 2nd clock | (0 0) (0 0 0 0 0 0 0 0 0 0 1) |
| 3rd clock | (0 0) (0 0 0 0 0 0 0 0 0 1 0) |
| 4th clock | (0 0) (0 0 0 0 0 0 0 0 1 0 0) |
| 5th clock | (0 0) (0 0 0 0 0 0 0 1 0 0 0) |
| 6th clock | (0 0) (0 0 0 0 0 0 1 0 0 0 0) |
| 7th clock | (0 0) (0 0 0 0 0 1 0 0 0 0 0) |
| 8th clock | (0 0) (0 0 0 0 1 0 0 0 0 0 0) |
| 9th clock | (0 0) (0 0 0 1 0 0 0 0 0 0 1) |
| 10th clock | (0 0) (0 0 1 0 0 0 0 0 0 1 0) |
| 11th clock | (0 0) (0 1 0 0 0 0 0 0 1 0 1) |
| 12th clock | (0 0) (1 0 0 0 0 0 0 1 0 1 0) |

In the meantime, basis conversion matrix calculation is implemented by a bit-by-bit multiplication between the outputs of the token register 20 and the outputs of the data register 40 and an addition of all bits resulting from the bit-by-bit multiplication. The components T<0:n−1> of each row in the basis conversion matrix $D_{sd}$, which are output from the token register 20 in response to the shift clocks, are respectively multiplied by the values b<0:n−1> output from the data register 30 by the "n" AND gates included in the AND gate unit 40. The outputs of the AND gate unit 40 are added by the XOR gate 50. The output of the XOR gate 50 is synchronized with the clock CK by the output register 60.

FIG. 5 is a flowchart of an embodiment of a basis conversion method for converting a dual representation to a standard representation according to the present invention. In step S30, the exponents n, k(3), k(2), and (k1) of a defining polynomial are input. In step S32, a dual basis represented coefficient vector B' to be subjected to basis conversion is stored in a register. In steps S34 through S40, the coefficient vector B' is converted to a standard basis represented coefficient vector B. The basis conversion shown in FIG. 5 is similar to that shown in FIG. 1, but a different basis conversion matrix is used.

The basis conversion matrix $D_{ds}$ for converting a dual representation to a standard representation is an inverse matrix of the basis conversion matrix $D_{sd}$ and is expressed by Formulae (45) through (47).

$$D_{ds} = \begin{pmatrix} [D_{ds}]_U & 0 \\ 0 & [D_{ds}]_L \end{pmatrix} \tag{45}$$

$$[D_{ds}]_U = \begin{pmatrix} 0 & 0 & \cdots & 0 & 1 \\ 0 & 0 & \cdots & 1 & 0 \\ \vdots & \vdots & \ddots & \vdots & \vdots \\ 0 & 1 & \cdots & 0 & 0 \\ 1 & 0 & \cdots & 0 & 1 \end{pmatrix}_{(k(1)+1)\times(k(1)+1)} \tag{46}$$

$$[D_{ds}]_L = \begin{pmatrix} & & 1 & & 1 & 1 \\ & \cdots & & 1 & 1 & \\ 1 & & \cdots & & 1 & \\ & 1 & \cdots & & & \\ 1 & 1 & & & & \\ 1 & & & & & \end{pmatrix}_{(n-k(1)-1)\times(n-k(1)-1)} \tag{47}$$

In the square matrix $[D_{ds}]_L$ shown in Formula 47, the number of 1s in each anti-diagonal and an interval between adjacent anti-diagonals is the same as described in the case of the basis conversion matrix $D_{sd}$. At the (k(1)+1)-th row in the basis conversion matrix $D_{ds}$, the anti-diagonals respectively start at the (k(2)−1)-th, (k(3)−1)-th, and (n−1)-th columns. If k(2)−k(1)=1, the shortest anti-diagonal does not appear.

Similarly to the basis conversion from a standard representation to a dual representation, the basis conversion from a dual representation to a standard representation is performed by sequential calculations shown in Formulae (48) through (52).

$$B = D_{ds} \cdot B' \tag{}$$

$$\begin{pmatrix} B_U \\ B_L \end{pmatrix} = \begin{pmatrix} [D_{ds}]_U & 0 \\ 0 & [D_{ds}]_L \end{pmatrix} \cdot \begin{pmatrix} B'_U \\ B'_L \end{pmatrix} \tag{48}$$

$$B_U = [D_{ds}]_U B'_U \tag{49}$$

When Formula (46) is applied to Formula (49), Formula (50) is obtained.

$$\begin{pmatrix} b_0 \\ b_1 \\ \vdots \\ b_{k(1)-1} \\ b_{k(1)} \end{pmatrix} = \begin{pmatrix} b'_{k(1)} \\ b'_{k(1)-1} \\ \vdots \\ b'_1 \\ b'_0 + b'_{k(1)} \end{pmatrix} \tag{50}$$

In steps S36 through S40, the (k(1)+1)-th through (n−1)-th components of the standard basis represented coefficient vector B are obtained using Formula (51). Here, $[D_{ds}]_L$ is the same as shown in Formula (47).

$$B_L = [D_{ds}]_L \cdot B'_L \tag{51}$$

As shown in Formula (47), the rows in $[D_{ds}]_L$ may be classified into rows having three 1s, rows having two 1s, and rows having a single 1. Accordingly, steps for implementing the right side of conversion Formula (50) may be classified into step S36 having three terms, step S38 having two terms, and step S40 having a single term. In other words, the 0-th through k(1)-th components of the standard basis represented coefficient vector B are obtained in step S34, the (k(1)+1)-th through (k(1)+n−k(3))-th components of the standard basis represented coefficient vector B are obtained in step S36, the (k(1)+1+n−k(3))-th through (k(1)+n−k(2))-th components of the standard basis represented coefficient vector B are obtained in step S38, and the (k(1)+1+n−k(2))-th through (n−1)-th components of the standard basis represented coefficient vector B are obtained in step S40. Consequently, the basis conversion result obtained by performing steps S34 through S40 is expressed by Formula (52).

$$\begin{pmatrix} b_{k(1)+1} \\ \vdots \\ b_{k(2)-1} \\ b_{k(2)} \\ \vdots \\ b_{k(3)-1} \\ b_{k(3)} \\ \vdots \\ b_{n-1} \end{pmatrix} = \begin{pmatrix} b'_{k(2)-1} + b'_{k(3)-1} + b'_{n-1} \\ \vdots \\ b'_{k(1)+1} + b'_{k(1)+1+k(3)-k(2)} + b'_{n+1+k(1)-k(2)} \\ b'_{k(1)+k(3)-k(2)} + b'_{n+k(1)-k(2)} \\ \vdots \\ b'_{k(1)+1} + b'_{n+1+k(1)-k(3)} \\ b'_{n+k(1)-k(3)} \\ \vdots \\ b'_{k(1)+1} \end{pmatrix} \tag{52}$$

When the defining polynomial of a finite field $GF(2^{13})$ is expressed by Formula (53), matrices used for basis conversion are given by Formulae (54) and (55), and a conversion formula and its result are expressed by Formulae (56) and (57).

$$x^{13} + x^6 + x^4 + x + 1 \tag{53}$$

$$[D_{ds}]_U = \begin{pmatrix} 0 & 1 \\ 1 & 1 \end{pmatrix} \tag{54}$$

-continued $$[D_{ds}]_L = \begin{pmatrix} 0 & 1 & 0 & 1 & & & & & 1 \\ 1 & 0 & 1 & & & & & 1 & \\ 0 & 1 & & & & & 1 & & \\ 1 & & & \cdots & & & & & \\ & 1 & & & & & & & \\ & & 1 & & & & & & \\ 1 & & & & & & & & \end{pmatrix}_{11 \times 11} \quad (55)$$

$B_U = [D_{ds}]_U \cdot B'_U$ $$\begin{pmatrix} b_0 \\ b_1 \end{pmatrix} = \begin{pmatrix} 0 & 1 \\ 1 & 1 \end{pmatrix} \cdot \begin{pmatrix} b'_0 \\ b'_1 \end{pmatrix} = \begin{pmatrix} b_1 \\ b_0 + b_1 \end{pmatrix} \quad (56)$$

$B_L = [D_{ds}]_L \cdot B'_L$ $$\begin{pmatrix} b_2 \\ b_3 \\ b_4 \\ b_5 \\ b_6 \\ b_7 \\ b_8 \\ b_9 \\ b_{10} \\ b_{11} \\ b_{12} \end{pmatrix} = \begin{pmatrix} b'_3 + b'_5 + b'_{12} \\ b'_2 + b'_4 + b'_{11} \\ b'_3 + b'_{10} \\ b'_2 + b'_9 \\ b'_8 \\ b'_7 \\ b'_6 \\ b'_5 \\ b'_4 \\ b'_3 \\ b'_2 \end{pmatrix} \quad (57)$$

An apparatus for basis conversion from a dual representation to a standard representation fundamentally includes the apparatus shown in FIG. 2 and performs the same control and arithmetic operations as the apparatus shown in FIG. 2, with the exception that a data signal D<0:n−1> output from the token controller 10 and stored in the upper and lower token registers 20a and 20b is different from that used in the apparatus shown in FIG. 2.

When the defining polynomial is $x^{13}+x^6+x^4+x+1$, in the upper token register 20a corresponding to the components of $[D_{ds}]_U$, after an initial value is set at the 0-th clock, a value 0 is input as the k(1)-th bit at each clock. The upper token register 20a is designed to shift to the left by one bit at each clock. A value 1 is input to the k(1)-th bit in the upper token register 20a at the k(1)-th clock. For example, when k(1)=1, the upper token register 20a outputs (0 1) at the 0-th clock and (1 1) at the first clock.

In the lower token register 20b corresponding to the components of $[D_{ds}]_L$, after an initial value is set at the (k(1)+1)-th clock, a value 0 is input to the (n−1)-th register at each clock starting from the (k(1)+2)-th clock. The lower token register 20b is designed to shift to the left by one bit at each clock. When n=13, k(3)=6, k(2)=4, and k(1)=1, the lower token register 20b is composed of n−k(1)−1=11 shift registers, and the initial values of the 11 shift registers are (0 1 0 1 0 0 0 0 0 0 1). The stored initial values are shifted to the left by one bit at each clock. After the initial values are shifted, a value 0 is input to the 12th register at each clock.

Then, as the shift clock increases, the upper token register 20a and the lower token register 20b have the following values.

| | |
|---|---|
| 0-th clock | (0 1) (0 0 0 0 0 0 0 0 0 0 0) |
| 1st clock | (1 1) (0 0 0 0 0 0 0 0 0 0 0) |
| 2nd clock | (0 0) (0 1 0 1 0 0 0 0 0 0 1) |
| 3rd clock | (0 0) (1 0 1 0 0 0 0 0 0 1 0) |
| 4th clock | (0 0) (0 1 0 0 0 0 0 0 1 0 0) |
| 5th clock | (0 0) (1 0 0 0 0 0 0 1 0 0 0) |
| 6th clock | (0 0) (0 0 0 0 0 0 1 0 0 0 0) |
| 7th clock | (0 0) (0 0 0 0 0 1 0 0 0 0 0) |
| 8th clock | (0 0) (0 0 0 0 1 0 0 0 0 0 0) |
| 9th clock | (0 0) (0 0 0 1 0 0 0 0 0 0 0) |
| 10th clock | (0 0) (0 0 1 0 0 0 0 0 0 0 0) |
| 11th clock | (0 0) (0 1 0 0 0 0 0 0 0 0 0) |
| 12th clock | (0 0) (1 0 0 0 0 0 0 0 0 0 0) |

In the meantime, basis conversion matrix calculations are implemented by a bit-by-bit multiplication between the outputs of the token register 20 and the outputs of the data register 40 and an addition of all bits resulting from the bit-by-bit multiplication. The components T<0:n−1> of each row in the basis conversion matrix $D_{sd}$, which are output from the token register 20 in response to the shift clocks, are respectively multiplied by the values b<0:n−1> output from the data register 30 by the "n" AND gates included in the AND gate unit 40. The outputs of the AND gate unit 40 are added by the XOR gate 50. The output of the XOR gate 50 is output in synchronization with the clock CK by the output register 60.

As described above, in an apparatus and method for basis conversion in a finite field $GF(2^n)$ according to the present invention, a normal pentanomial in an arbitrary degree is used as a defining polynomial so that basis conversion between a standard representation and a dual representation may be efficiently performed. Consequently, a dual basis multiplier can be efficiently implemented.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method of converting a standard representation to a dual representation in a finite field $GF(2^n)$, in which a standard basis represented coefficient vector $B=(b_0, b_1, b_2, \ldots, b_{n-1})$ of an element B of the finite field $GF(2^n)$ is converted to a dual basis represented coefficient vector $B'=(b'_0, b'_1, b'_2, \ldots, b'_{n-1})$ using a defining polynomial $x^n+x^{k(3)}+x^{k(2)}+x^{k(1)}+1$, the method being performed by an apparatus for basis conversion, the apparatus including a n-bit token register to store each row vector in a basis conversion matrix, a n-bit data register to store a vector to be converted, n bit multipliers performing bit-by-bit multiplications between the outputs of the token register and the outputs of the data registers, an adder connected to the bit multipliers to add the results of the bit-by-bit multiplications and a controller to control the token register to output the row vectors, the method comprising:

the controller receiving the exponents n, k(3), k(2), and k(1) of the defining polynomial $x^n+x^{k(3)}+x^{k(2)}+x^{k(1)}+1$;

the data register storing $B=(b_0, b_1, b_2, \ldots, b_{n-1})$;

the controller reading $(b_{k(1)}, b_{k(1)-1}, b_{k(1)-2}, \ldots, b_0)$ from the data register and obtaining 0-th through k(1)-th components of B' by performing a vector operation $(b'_0, b'_1, b'_2, \ldots, b'_{k(1)})=(b_0+b_{k(1)}, b_{k(1)-1}, b_{k(1)-2}, \ldots, b_0)$ through the bit multipliers and adder, The controller reading $(b_{n-1}, b_{n-2}, \ldots, b_{k(3)})$ from the data register and obtaining (k(1)+1)-th through (k(1)+n−k(3))-th components of the dual basis represented coefficient vector B' by performing a vector operation $(b'_{k(1)+1}, b'_{k(1)+2}, \ldots, b'_{k(1)+n-k(3)})=(b_{n-1}, b_{n-2}, \ldots, b_{k(3)})$ through the bit multipliers and adder;

the controller reading $(b_{k(3)-1}, \ldots, b_{k(2)})$ and $(b_{n-1}, \ldots, b_{n-k(3)+k(2)})$ from the data register and obtaining (k(1)+1+n−k(3))-th through (k(1)+n−k(2))-th components of B' by performing a vector operation $(b'_{k(1)+1+n-k(3)}, b'_{k(1)+2+n-k(3)}, \ldots, b'_{k(1)+n-k(2)})=(b_{k(3)-1}+b_{n-1}, b_{k(3)-2}+b_{n-2}, \ldots, b_{k(2)}+b_{n-k(3)+(2)})$; and the controller reading $b_{k(2)-1}, b_{k(2)-2}, \ldots, b_{k(1)+1}, b_{n-1-k(3)+k(2)}), b_{n-2-k(3)+k(2)}, \ldots, b_{n+1-k(3)+k(1)})$ and $(b_{n-1}, b_{n-2}, \ldots, b_{n+1-k(2)+k(1)})$ from the data register and obtaining (k(1)+1+n−k(2))-th through (n−1)-th components of B' by performing a vector operation $(b'_{k(1)+1+n-k(2)}, b'_{k(1)+2+n-k(2)}, \ldots, b'_{n-1})=b_{k(2)-2}+b_{n-2-k(3)+k(2)}+b_{n-2}, \ldots, b_{k(1)+1}+b_{n+1-k(3)+k(1)}+b_{n+1-k(2)+k(1)})$ through the bit multipliers and adder.

2. A multiplication method, comprising:

converting a standard representation to a dual representation using the method as claimed in claim 1; and performing dual basis multiplication.

3. The multiplication method as claimed in claim 2, further comprising converting a dual representation from the dual basis multiplication to a standard representation.

4. A method of converting a dual representation to a standard representation in a finite field $GF(2^n)$, in which a dual basis represented coefficient vector $B'=(b'_0, b'_1, b'_2, \ldots, b'_{n-1})$ of an element B of the finite field $GF(2^n)$ is converted to a standard basis represented coefficient vector $B=(b_0, b_1, b_2, \ldots, b_{n-1})$ using a defining polynomial $x^m+x^{k(3)}+x^{k(2)}+x^{k(1)}+1$, the method being performed by an apparatus for basis conversion, the apparatus including a n-bit data register to store each row vector in a basis conversion matrix, a n-bit data register to store a vector to be converted, n bit multipliers performing bit-by-bit multiplications between the outputs of the token register and the outputs of the data registers, an adder connected to the bit multipliers to add the results of the bit-by-bit multiplications and a controller to control the token register to output the row vectors, the method comprising:

the controller receiving the exponents n, k(3), k(2), and k(1) of the defining polynomial;

the data register storing $B'=(b'_0, b'_1, b'_2, \ldots, b'_{n-1})$ to be converted;

the controller reading $(b_{k(1)}', b_{k(1)-1}', b_{k(1)-2}', \ldots, b_0')$ from the data register and obtaining 0-th through k(1)-th components of B by performing a vector operation $(b_0, b_1, \ldots, b_{k(1)-1}, b_{k(1)})=(b'_{k(1)}, b'_{k(1)-1}, \ldots, b'_1, b'_0+b'_{k(1)})$ through the bit multipliers and adder;

the controller reading $(b_{k(1)+k(3)-k(2)}', \ldots, b_{k(1)+1}')$ and $(b_{n+k(1)-k(2)}', \ldots, b_{n+1+k(1)-k(3)}')$ frp, the data register and obtaining (k(1)+1)-th through (k(2)−1)-th components of B by performing a vector operation $(b_{k(1)+1}, b_{k(1)+2}, \ldots, b_{k(2)-1})=(b'_{k(2)-1}+b'_{k(3)-1}+b'_{n-1}, b'_{k(2)-2}+b'_{k(3)-2}+b'_{n-2}, \ldots, b'_{k(1)+1}+b'_{k(1)+1+k(3)-k(2)}+b'_{n+1+k(1)-k(2)})$ through the bit multipliers and adder;

the controller reading $(b_{k(1)+k(3)-k(2)}', \ldots, b_{k(1)+1}')$ and $(b_{n+k(1)-k(2)}', \ldots, b_{n+1+k(1)-k(3)}')$ and obtaining k(2)-th through (k(3)−1)-th components of B by performing a vector operation $(b_{k(2)}, b_{k(2)+1}, \ldots, b_{k(3)-1})=(b'_{k(1)+k(3)-k(2)}+b'_{n+k(1)-k(2)}, b'_{k(1)+k(3)-k(2)-1}+b'_{n+k(1)-k(2)-1}, \ldots, b'_{k(1)+1}+b'_{n+1+k(1)-k(3)})$; and the controller reading $(b_{n+k(1)-k(3)}')$ from the data register and obtaining k(3)-th through (n−1)-th components of B by performing a vector operation $(b_{k(3)}, b_{k(3)+1}, \ldots, b_{n-1})=(b'_{n+k(1)-k(3)}, b'_{n+k(1)-k(3)-1}, \ldots, b'_{k(1)+1})$ through the bit multipliers and adder.

5. A multiplication method, comprising:

converting a standard representation to a dual representation;

performing dual basis multiplication; and converting a dual representation from the dual basis multiplication to a standard representation includes using the method as claimed in claim 4.

6. An apparatus for basis conversion between a standard basis and a dual basis in a finite field $GF(2^n)$, by which conversion between a standard basis represented coefficient vector $B=(b_0, b_1, b_2, \ldots, b_{n-1})$ of an element B of the finite field $GF(2^n)$ and a dual basis represented coefficient vector $B'=(b'_0, b'_1, b'_2, \ldots, b'_{n-1})$ is performed using a basis conversion matrix determined in accordance with a defining polynomial $x^n+x^{k(3)}+x^{k(2)}+x^{k(1)}+1$, the apparatus comprising:

a token register, which is composed of "n" shift registers classified into an upper token register with (k(1)+1) bits and a lower token register with (n−k(1)−1) bits, each shift register shifting input data to the left by one bit at each clock in response to an enable signal and a clock, wherein the outputs of the shift registers respectively correspond to the components of each row in the basis conversion matrix;

a token controller, which receives the exponents n, k(3), k(2), and k(1) of the defining polynomial and outputs an (n−1)-bit input selection signal, the enable signal for activating the shift operation of the token register, a clock for the token register, initial values for the respective upper and lower token registers, a data input signal to a k(1)-th register of the token register, and a data input signal to an (n−1)-th register of the token register;

a multiplexer, which separates the upper token register from the lower token register according to the value of k(1) in response to the input selection signal and selects a data input path for the token register;

a data register, which stores a coefficient vector to be converted;

an AND gate unit, which performs bit-by-bit multiplication on the output of the token register and the output of the data register;

an XOR gate, which adds all of the outputs of the AND gate unit; and an output register, which is connected to the XOR gate and synchronizes the output of the XOR gate with the clock.

7. A multiplier, comprising;

the apparatus as claimed in claim 6 for basis conversion from a standard basis to a dual basis; and a dual basis multiplier.

8. The multiplier as claimed in claim 7, further comprising an apparatus for basis conversion from a dual basis to a standard basis, the apparatus for basis conversion from a dual basis to a standard basis receiving an output from the dual basis multiplier.

9. A multiplier comprising:
  an apparatus for basis conversion from a standard basis to a dual basis;
  a dual basis multiplier; and
  an apparatus for basis conversion from a dual basis to a standard basis includes the apparatus as claimed in claim 6, the apparatus for basis conversion from a dual basis to a standard basis receiving an output from the dual basis multiplier.

10. A cryptosystem, comprising the multiplier as claimed in claim 9.

11. A Reed-Solomon system, comprising the multiplier as claimed in claim 9.

12. A cryptosystem, comprising the multiplier as claimed in claim 7.

13. A Reed-Solomon system, comprising the multiplier as claimed in claim 7.

* * * * *